United States Patent Office.

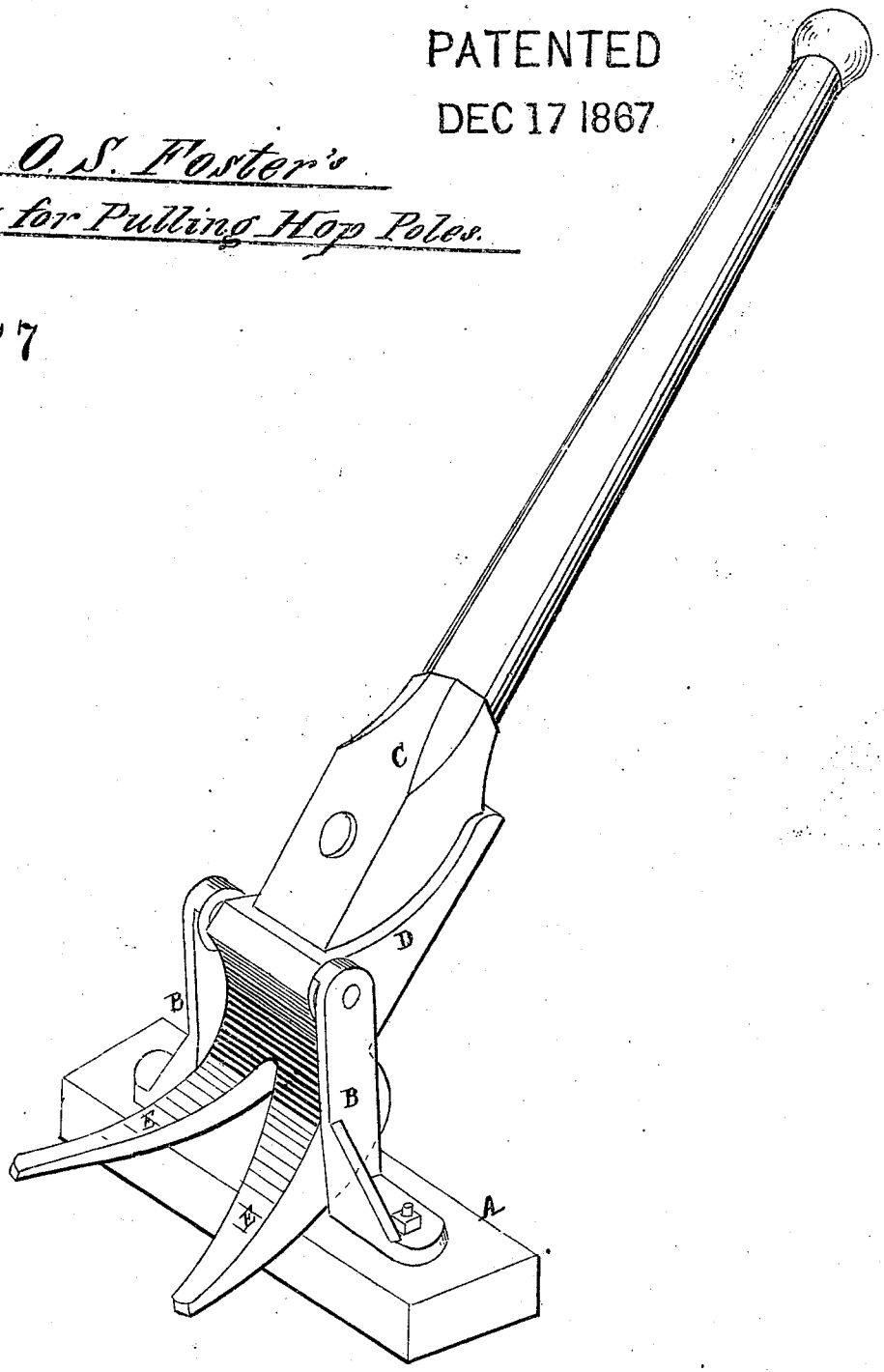

O. S. FOSTER, OF DURHAMVILLE, NEW YORK.

Letters Patent No. 72,277, dated December 17, 1867.

IMPROVEMENT IN JACK FOR PULLING HOP-POLES.

*The Schedule referred to in these Letters Patent and making part of the same.*

TO ALL WHOM IT MAY CONCERN:

Be it known that I, O. S. FOSTER, of Durhamville, in the county of Oneida, and in the State of New York, have invented certain new and useful Improvements in Jack for Pulling Hop-Poles; and do hereby declare that the following is a full, clear, and exact description thereof, reference being had to the accompanying drawings, and to the letters of reference marked thereon.

In the annexed drawings, making part of this specification, A represents a block, which has secured to its upper side two standards, B B. Placed between these standards is a metallic head, D, said head being provided with trunnions, which have their bearings in the standards. Head D is provided at one end with a long wooden handle, C, and at the other with two claws, E E. These claws come together, as seen, so as to form a V-shaped opening between them, and the metal is bevelled away from their inner sides, so as to leave their inner upper edges sharp or edged.

In using this machine, the block is placed upon the ground near the hop-pole, and the handle C elevated. The pole is caught between the claws, and their sharp edges prevent its slipping. By bearing down upon the handle C, the pole is drawn out of the ground.

Having thus fully described my invention, what I claim as new, and desire to secure by Letters Patent, is—

The metallic head D, having trunnions and claws E E, all formed of one piece, and connected to L-shaped standards B B, which are secured to a block, A, and provided with a suitable handle, C, all constructed and used for the purpose specified.

In testimony that I claim the foregoing, I have hereunto set my hand, this 23d day of July, 1867.

O. S. FOSTER.

Witnesses:
J. E. FERRY,
O. T. POTTER.